United States Patent
Otenko

(10) Patent No.: US 10,095,562 B2
(45) Date of Patent: Oct. 9, 2018

(54) SYSTEM AND METHOD FOR TRANSFORMING A QUEUE FROM NON-BLOCKING TO BLOCKING

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 24 days.

(21) Appl. No.: 13/781,500

(22) Filed: Feb. 28, 2013

(65) Prior Publication Data

US 2014/0245309 A1  Aug. 28, 2014

(51) Int. Cl.
*G06F 9/54* (2006.01)

(52) U.S. Cl.
CPC ........ *G06F 9/546* (2013.01); *G06F 2209/548* (2013.01)

(58) Field of Classification Search
CPC ....... G06F 2209/5018; G06F 2209/548; G06F 2209/5011; G06F 9/546; G06F 9/5005
See application file for complete search history.

(56) References Cited

U.S. PATENT DOCUMENTS

| | | |
|---|---|---|
| 5,109,384 A | 4/1992 | Tseung |
| 6,449,614 B1 | 9/2002 | Marcotte |
| 6,874,144 B1 | 3/2005 | Kush |
| 6,895,590 B2 | 5/2005 | Yadav |
| 6,938,085 B1 | 8/2005 | Belkin et al. |
| 7,046,676 B2 | 5/2006 | Goetzinger et al. |
| 7,554,993 B2 | 6/2009 | Modi et al. |
| 7,685,391 B1 | 3/2010 | Cholleti et al. |
| 7,761,617 B2 | 7/2010 | Seigneret et al. |
| 7,876,677 B2 | 1/2011 | Cheshire |
| 7,991,904 B2 | 8/2011 | Melnyk et al. |
| 8,130,776 B1 | 3/2012 | Sundararajan |
| 8,131,860 B1 | 3/2012 | Wong et al. |
| 8,255,914 B1 | 8/2012 | Joyce et al. |

(Continued)

FOREIGN PATENT DOCUMENTS

| | | |
|---|---|---|
| CN | 10290251 | 1/2013 |
| JP | 2005128952 | 5/2005 |

(Continued)

OTHER PUBLICATIONS

European Patent Office, International Searching Authority, International Search Report and Written Opinion dated Mar. 6, 2014 for International Application No. PCT/US2013/067106, 11 pages.

(Continued)

*Primary Examiner* — Jacob D Dascomb
(74) *Attorney, Agent, or Firm* — Tucker Ellis LLP

(57) ABSTRACT

A system and method can use continuation-passing to transform a queue from non-blocking to blocking. The non-blocking queue can maintain one or more idle workers in a thread pool that is not accessible from outside of the non-blocking queue. The continuation-passing can eliminate one or more serialization points in the non-blocking queue, and allows a caller to manage the one or more idle workers in the thread pool from outside of the non-blocking queue.

18 Claims, 11 Drawing Sheets

(56) References Cited

U.S. PATENT DOCUMENTS

| | | | |
|---|---|---|---|
| 8,347,302 B1 | 1/2013 | Vincent et al. | |
| 8,504,691 B1 | 8/2013 | Tobler et al. | |
| 8,539,486 B2 | 9/2013 | Cain et al. | |
| 8,578,033 B2 | 11/2013 | Mallart | |
| 8,850,441 B2 | 9/2014 | Allen | |
| 8,863,136 B2 | 10/2014 | Allen | |
| 8,918,791 B1 | 12/2014 | Chudgar et al. | |
| 8,930,584 B2 | 1/2015 | Otenko et al. | |
| 2001/0034753 A1* | 10/2001 | Hildebrand | G06F 9/50 718/107 |
| 2002/0114338 A1* | 8/2002 | Craig | H04L 45/566 370/401 |
| 2002/0143847 A1 | 10/2002 | Smith | |
| 2002/0174136 A1 | 11/2002 | Cameron et al. | |
| 2003/0014480 A1 | 1/2003 | Pullara et al. | |
| 2003/0053469 A1 | 3/2003 | Wentink | |
| 2003/0078958 A1 | 4/2003 | Pace et al. | |
| 2003/0081544 A1 | 5/2003 | Goetzinger et al. | |
| 2003/0110232 A1 | 6/2003 | Chen | |
| 2003/0120822 A1 | 6/2003 | Langrind et al. | |
| 2004/0154020 A1* | 8/2004 | Chen | G06F 9/5027 718/107 |
| 2004/0177126 A1 | 9/2004 | Maine | |
| 2004/0205771 A1 | 10/2004 | Sudarshan et al. | |
| 2005/0021354 A1 | 1/2005 | Brendle et al. | |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0262215 A1 | 11/2005 | Kirov et al. | |
| 2005/0283577 A1 | 12/2005 | Sivaram et al. | |
| 2006/0015600 A1 | 1/2006 | Piper | |
| 2006/0015700 A1 | 1/2006 | Burka | |
| 2006/0031846 A1 | 2/2006 | Jacobs et al. | |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0230411 A1 | 10/2006 | Richter et al. | |
| 2006/0294417 A1 | 12/2006 | Awasthi et al. | |
| 2007/0118601 A1 | 5/2007 | Pacheco | |
| 2007/0156869 A1* | 7/2007 | Galchev et al. | 709/223 |
| 2007/0198684 A1 | 8/2007 | Mizushima | |
| 2007/0203944 A1 | 8/2007 | Batra et al. | |
| 2007/0263650 A1 | 11/2007 | Subramania et al. | |
| 2008/0044141 A1 | 2/2008 | Willis et al. | |
| 2008/0098458 A2 | 4/2008 | Smith | |
| 2008/0140844 A1 | 6/2008 | Halpern | |
| 2008/0286741 A1 | 11/2008 | Call | |
| 2009/0034537 A1 | 2/2009 | Colrain et al. | |
| 2009/0150647 A1 | 6/2009 | Mejdrich et al. | |
| 2009/0172636 A1 | 7/2009 | Griffith | |
| 2009/0182642 A1 | 7/2009 | Sundaresan | |
| 2009/0327471 A1 | 12/2009 | Astete et al. | |
| 2010/0082855 A1 | 4/2010 | Accapadi et al. | |
| 2010/0100889 A1* | 4/2010 | Labrie et al. | 718/106 |
| 2010/0198920 A1 | 8/2010 | Wong et al. | |
| 2010/0199259 A1 | 8/2010 | Quinn | |
| 2010/0278190 A1 | 11/2010 | Yip et al. | |
| 2011/0029812 A1 | 2/2011 | Lu et al. | |
| 2011/0055510 A1 | 3/2011 | Fritz et al. | |
| 2011/0071981 A1 | 3/2011 | Ghosh et al. | |
| 2011/0119673 A1 | 5/2011 | Bloch et al. | |
| 2011/0153992 A1 | 6/2011 | Srinivas et al. | |
| 2011/0161457 A1 | 6/2011 | Sentinelli | |
| 2011/0231702 A1 | 9/2011 | Allen et al. | |
| 2012/0023557 A1 | 1/2012 | Bevan | |
| 2012/0054472 A1* | 3/2012 | Altman et al. | 712/219 |
| 2012/0066400 A1 | 3/2012 | Reynolds | |
| 2012/0066460 A1 | 3/2012 | Bihani | |
| 2012/0158684 A1 | 6/2012 | Lowenstein et al. | |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0132970 A1* | 5/2013 | Miyoshi | 718/104 |
| 2013/0145373 A1* | 6/2013 | Noro | 718/102 |
| 2013/0304848 A1 | 11/2013 | Lyle et al. | |

FOREIGN PATENT DOCUMENTS

| | | |
|---|---|---|
| TW | 201229897 | 7/2012 |
| WO | 2012084835 | 6/2012 |

OTHER PUBLICATIONS

Baldwin, Richard G., "The ByteBuffer Class in Java", Aug. 20, 2012, 14 pages. Retrieved from : <http://www.developer.com/author/Richard-G.-Baldwin-64720.htm>.

European Patent Office, International Searching Authority, International Search Report and Written Opinion dated Mar. 14, 2014 for International Application No. PCT/US2013/067108, 12 pages.

Office Action issued by United States Patent and Trademark Office for U.S. Appl. No. 14/167,792, dated May 12, 2016, 9 pages.

Takeshi Motohashi, "An Activity-Based Parallel Execution Mechanism Using Distributed Activity Queues", Journal of Information Processing, Japan, Information Processing Society of Japan, Oct. 15, 1994, vol. 35, No. 10, pp. 2128-2137, 10 pages.

SIPO Search Report for Chinese Application No. 201380060771.3, dated Sep. 5, 2017, 10 pages.

SIPO Search Report for Chinese Application No. 201380060771.3, dated Sep. 13, 2017, 11 pages.

Office Action dated Sep. 26, 2017 for Japanese Patent Application No. 2015-560169, 4 pages.

* cited by examiner

SYSTEM AND METHOD FOR TRANSFORMING A QUEUE FROM NON-BLOCKING TO BLOCKING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. Patent Application entitled "SYSTEM AND METHOD FOR SUPPORTING COOPERATIVE CONCURRENCY IN A MIDDLEWARE MACHINE ENVIRONMENT", application Ser. No. 13/781,475, filed Feb. 28, 2013, by inventor Oleksandr Otenko;

U.S. Patent Application entitled "SYSTEM AND METHOD FOR USING A SEQUENCER IN A CONCURRENT PRIORITY QUEUE", application Ser. No. 13/781,493, filed Feb. 28, 2013, by inventor Oleksandr Otenko.

FIELD OF INVENTION

The present invention is generally related to computer systems and software such as middleware, and is particularly related to systems and methods for supporting queue in a middleware machine environment.

BACKGROUND

Within any large organization, over the span of many years, the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administrative task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for using continuation-passing to transform a queue from non-blocking to blocking. The non-blocking queue can maintain one or more idle workers in a thread pool that is not accessible from outside of the non-blocking queue. The continuation-passing can eliminate one or more serialization points in the non-blocking queue, and allows a caller to manage the one or more idle workers in the thread pool from outside of the non-blocking queue.

Other objects and advantages of the present invention will become apparent to those skilled in the art from the following detailed description of the various embodiments, when read in light of the accompanying drawings.

DETAILED DESCRIPTION

Described herein are systems and methods that can use continuation passing to transfer a queue from non-blocking to blocking in a middleware machine environment.

Figure 1:
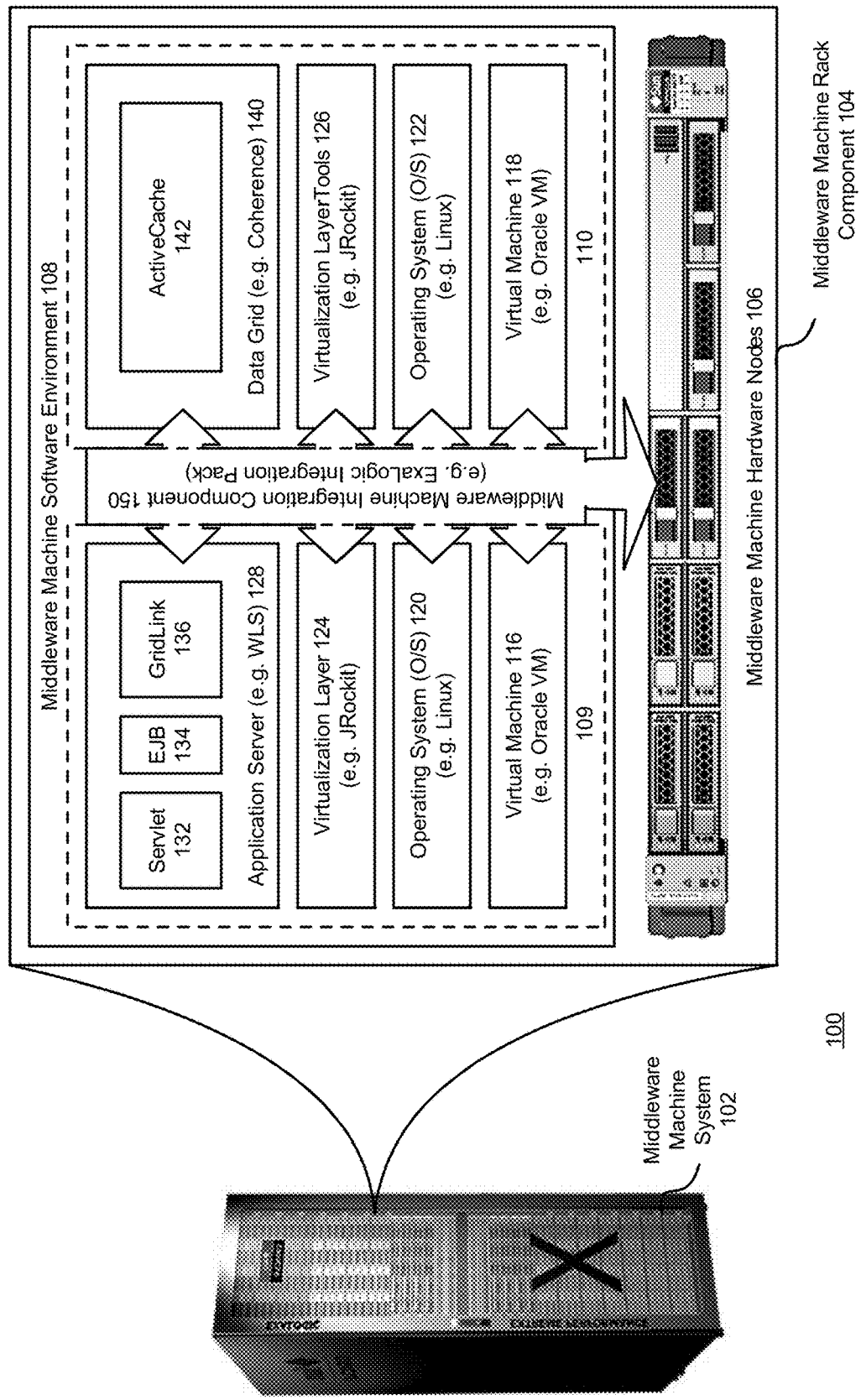
FIG. 1 shows an illustration of a middleware machine environment 100, in accordance with an embodiment of the invention.

FIG. 1 shows an illustration of a middleware machine environment 100, in accordance with an embodiment of the invention. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances. For example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers). Another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
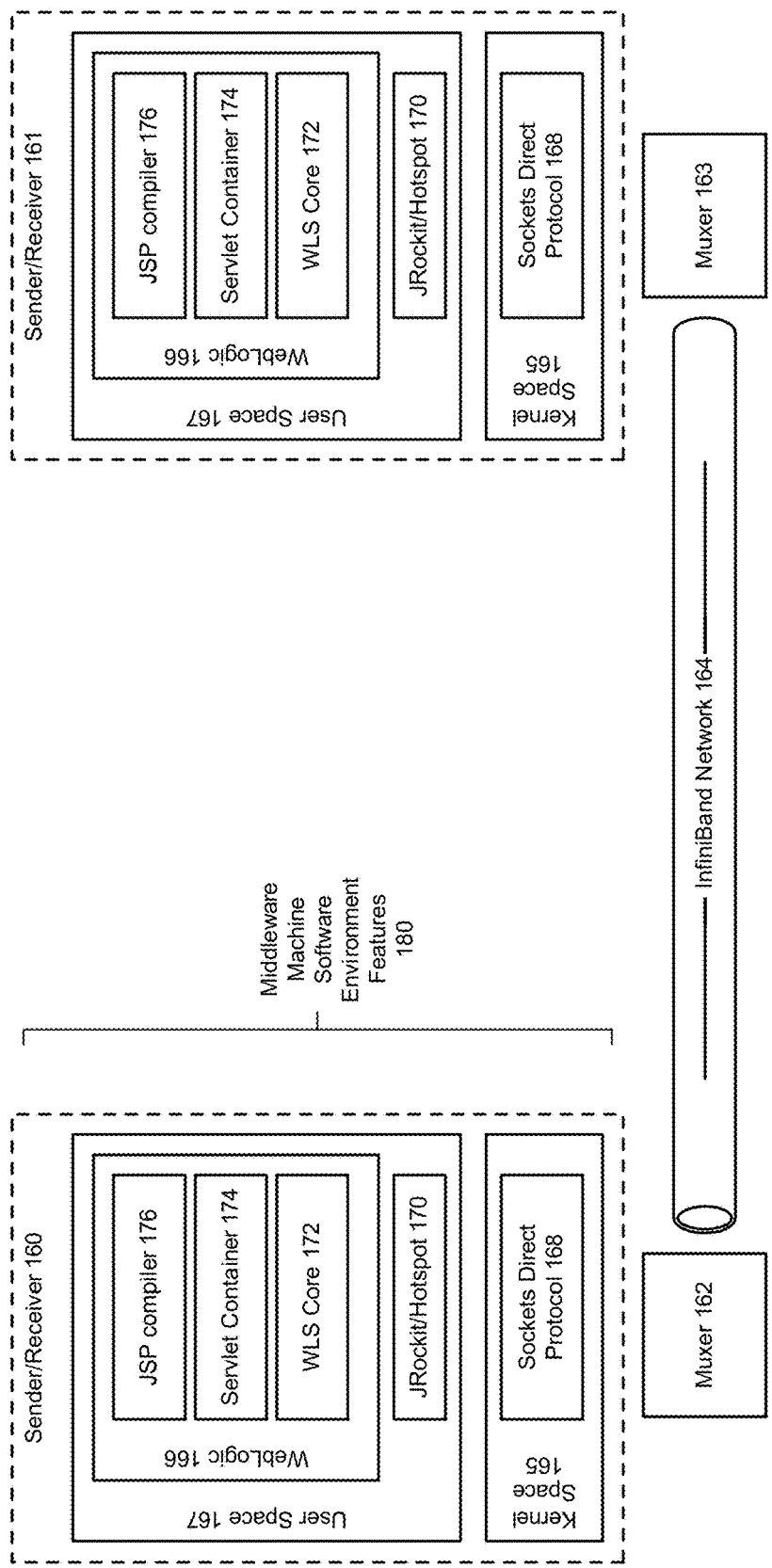
FIG. 2 shows another illustration of a middleware machine platform or environment, in accordance with an embodiment of the invention.

FIG. 2 shows another illustration of a middleware machine platform or environment, in accordance with an embodiment of the invention. As shown in FIG. 2, each application server instance can act as a sender and/or receiver 160, 161 within the middleware machine environment. Each application server instance is also associated with a muxer 162, 163, that allows the application servers to communicate with one another via an InfiniBand network 164. In the example shown in FIG. 2, an application server instance can include a kernel space 165, user space 167, and application server (e.g. WebLogic space) 166, which in turn can be associated with a sockets direct protocol 168, a JVM (e.g. JRockit/Hotspot layer) 170, a WLS core 172, a servlet container 174, and a JSP compiler 176. In accordance with other examples, other combinations of middleware-type software can be included. In accordance with various embodiments, the machine integration component can provide features 180 such as Zero Buffer Copies, Scatter/Gather I/O, T3 Connections, Lazy Deserialization, and GridLink DataSource, to provide the basis for, and improve performance within, the shared infrastructure.

Priority Queue

In accordance with various embodiments of the invention, a concurrent system can use a priority queue to prioritize incoming requests in order to provide service with an appropriate service level agreement (SLA).

Figure 3:
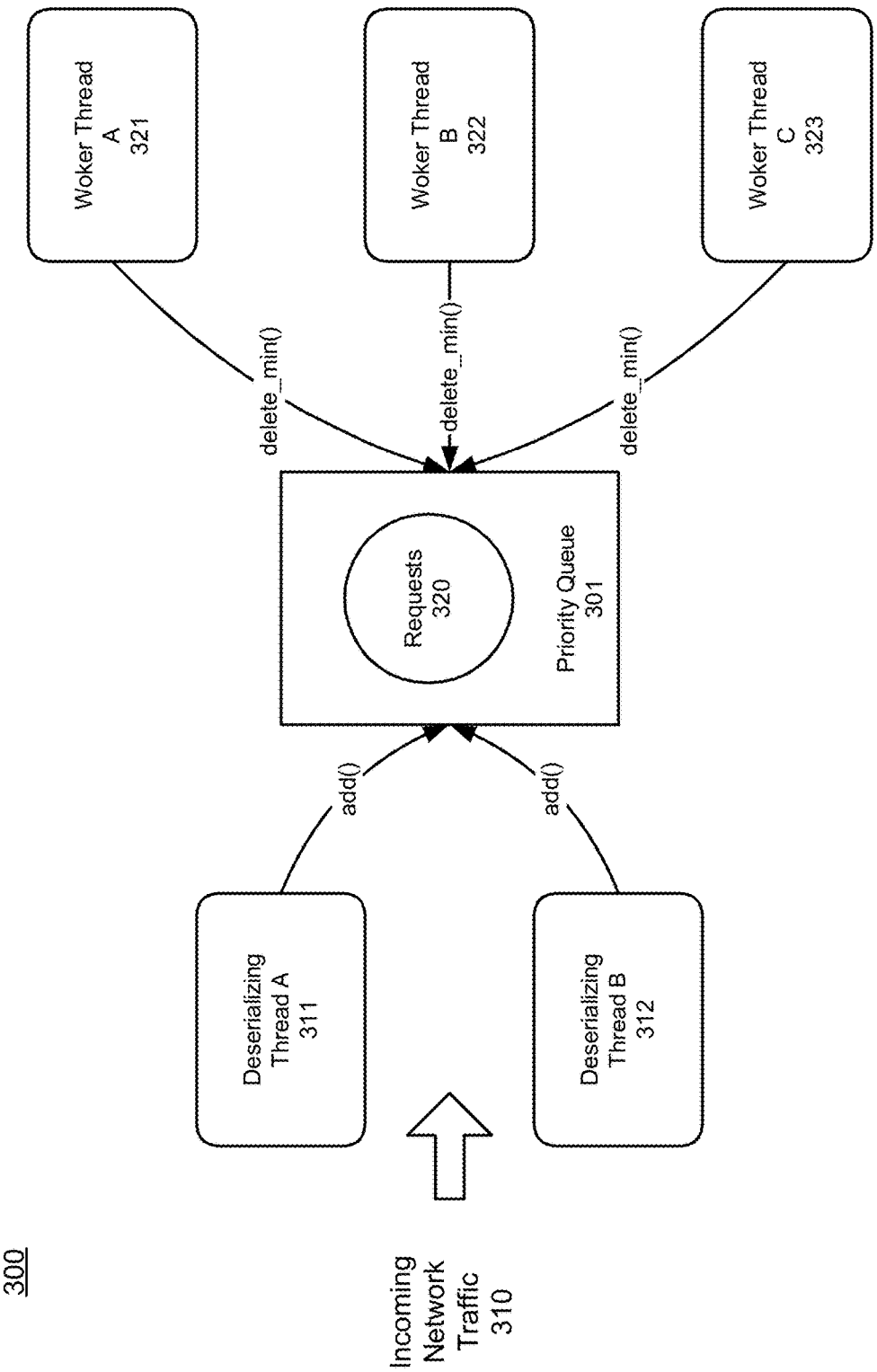
FIG. 3 shows an illustration of using a priority queue for handling requests in a middleware machine environment, in accordance with various embodiments of the invention.

FIG. 3 shows an illustration of using a priority queue for handling requests in a middleware machine environment, in accordance with various embodiments of the invention. As shown in FIG. 3, one or more threads, e.g. deserializing threads A-B 311-312, can deserialize the incoming network traffic 310 that contains one or more requests 320. The deserializing threads A-B 311-312 can place the requests 320 in a priority queue 301, e.g. using add( ) methods. Then, a plurality of worker threads, e.g. worker threads A-C 321-323, can access the priority queue 301 concurrently and can claim the requests 320, e.g. using delete_min( ) methods.

The priority queue 301 can be designed to meet demanding concurrency criteria, so that the interaction between the contenders does not cause degradation in the throughput of the system as a whole. Additionally, the priority queue 301 can be implemented to have a fixed memory footprint, so that the JVM is able to better optimize its operations on fixed-size arrays of primitives, and can achieve substantial cache efficiency.

In accordance with various embodiments of the invention, the priority queue 301 can be implemented based on a calendar queue, e.g. the calendar queue provided in the WebLogic Application Server. The calendar queue can include a calendar with multiple buckets, each of which can store events that fall within a particular slice of time. For example, the multiple buckets can be sorted and arranged by comparing the target service time with a current time. If the difference in time is in the first byte, then the request can be stored in a bucket in the first 256 buckets. The specific bucket can be chosen using the actual value of the target time for executing the request. Furthermore, if the difference in time is in the second byte, then the request can be stored in a bucket in the second 256 buckets.

When a consumer, e.g. via one of the worker threads A-C 321-323, tries to remove the next request that is configured to be execute the earliest, the system can scan the calendar for the first bucket that is not empty. If this bucket is not one of the first 256 buckets, then the calendar queue can use a loop and promote method to move the requests to the buckets "one level down" toward the first 256 buckets. Eventually, some requests can be promoted to one or more buckets in the first 256 buckets, and the consumer can claim a request and proceed accordingly.

The above promotion process can involve logarithmic cost, which may have an impact on the overall performance of the system. Additionally, there can be other designs for the calendar queue, the performance of which may be limited to a choice between "O(1) add, O(log N) delete_min," and "O(log N) add, O(1) delete_min."

Figure 4:
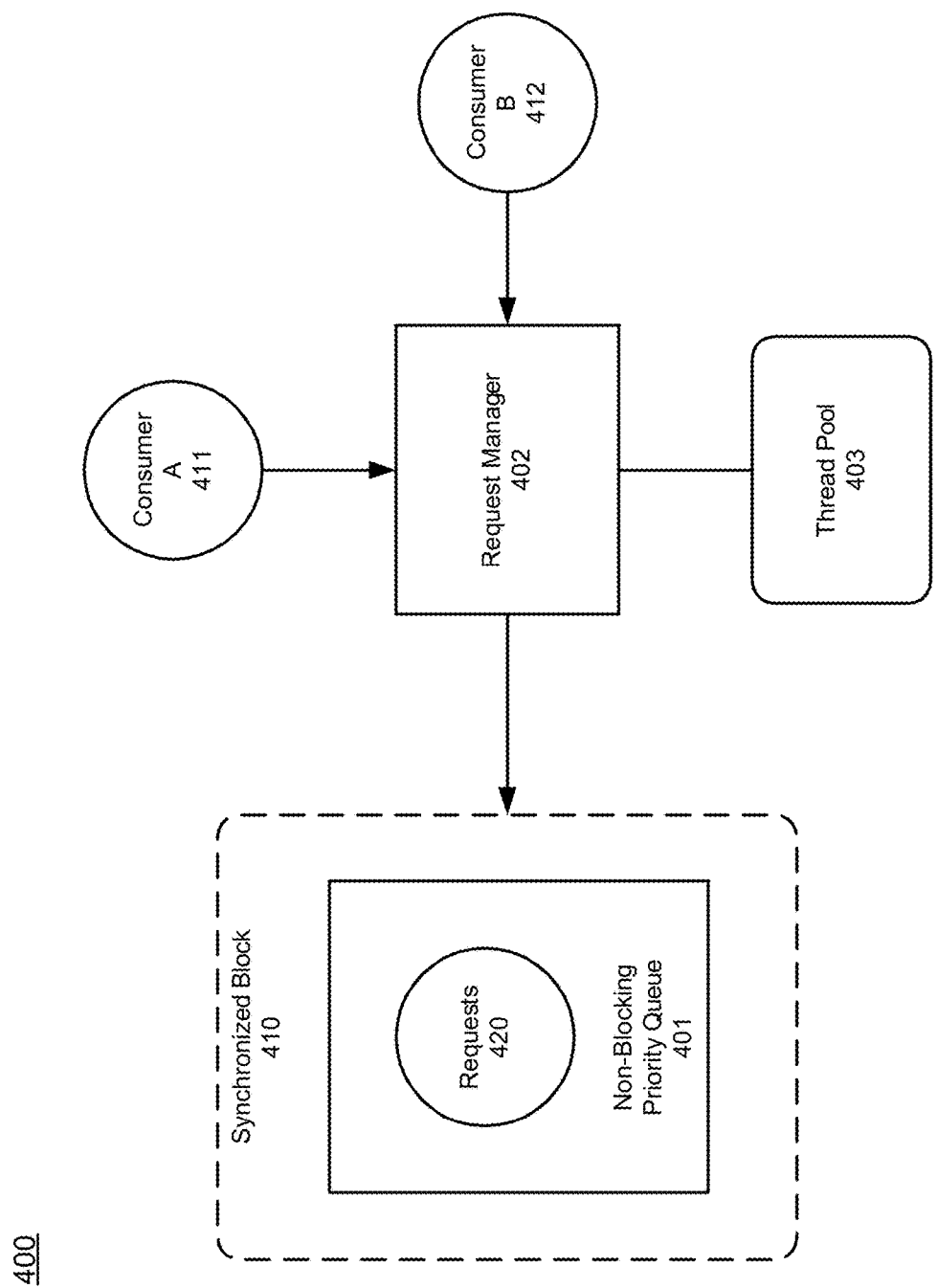
FIG. 4 shows an illustration of supporting a non-blocking queue in a middleware machine environment.

FIG. 4 shows an illustration of supporting a non-blocking queue in a middleware machine environment. As shown in FIG. 4, a plurality of consumers, e.g. consumers A-B 411-412, can concurrently access a priority queue 401 in a middleware machine environment 400. The priority queue 401 can be implemented as a non-blocking queue and can be accessed via a request manager 402.

The request manager 402, which manages a thread pool 403, can have a separate logic for associating different threads with different requests. For example, the request manager 402 can serialize all thread pool method calls by wrapping the calls to the priority queue 401 in a synchronized statement, or a synchronized block 410, using a lock mechanism.

Thus, the operations on the priority queue 401 may be limited by the single-threaded design since the serialization is done outside the non-blocking priority queue 401.

Concurrent Priority Queue

Figure 5:
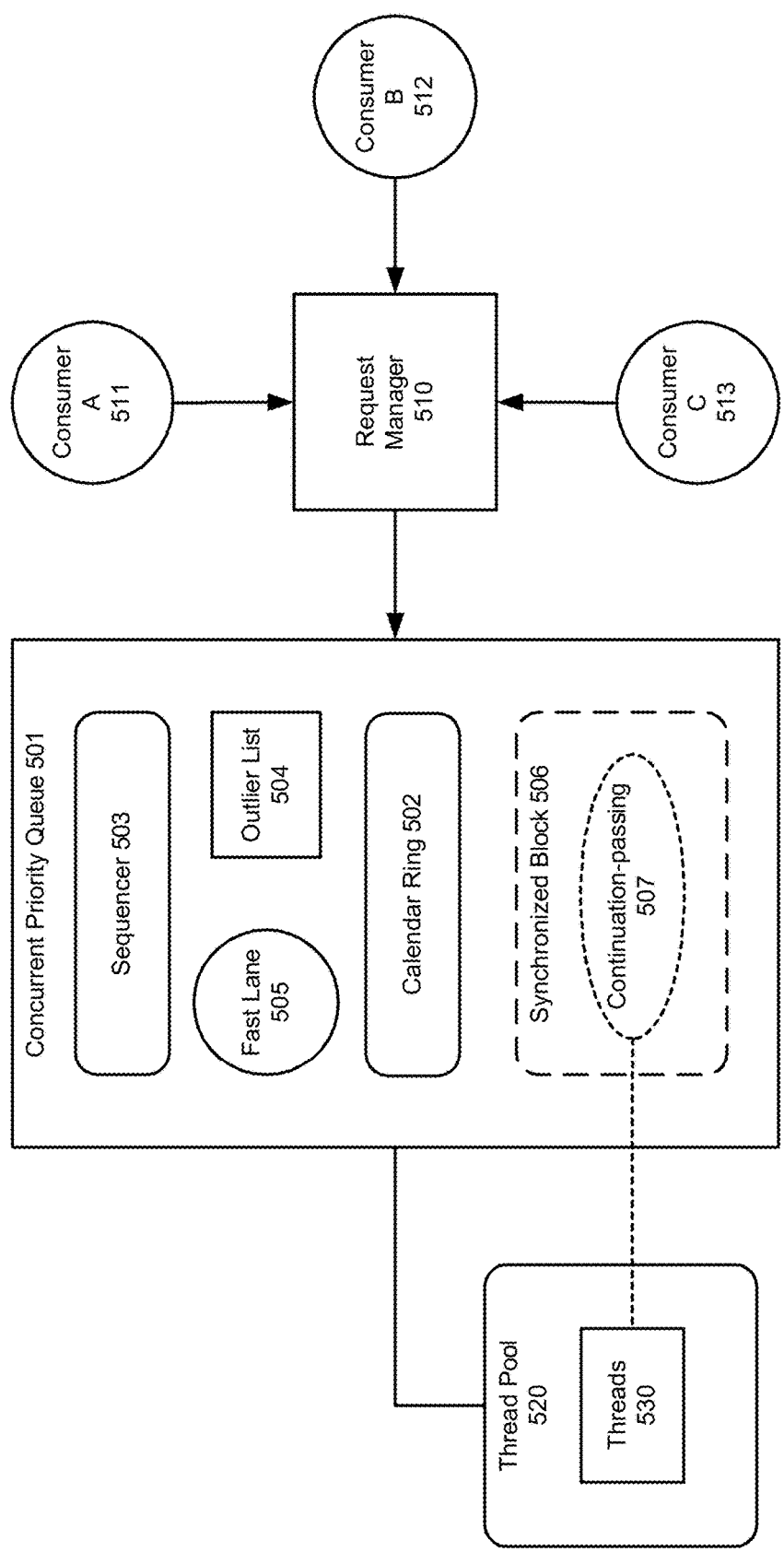
FIG. 5 shows an illustration of supporting a concurrent priority queue in accordance with various embodiments of the invention.

FIG. 5 shows an illustration of supporting a concurrent priority queue in accordance with various embodiments of the invention. As shown in FIG. 5, a plurality of consumers, e.g. consumer A-C 511-513 can concurrently access a concurrent priority queue 501 in a middleware machine environment 500.

The concurrent priority queue 501 can include a calendar, e.g. a calendar ring 502, which is capable of prioritizing and storing incoming requests. The calendar ring 502, the size of which is limited, can be configured to store requests that have a target response time within a preconfigured time limit. Within the calendar ring 502, a request can be stored, or placed, directly in the ring buffer at a position that matches Quality of Service (QoS) of the request, e.g. the target service time.

Thus, the system can achieve a much cheaper lookup for requests without changing the memory footprint of a calendar queue. Furthermore, the system can reduce the logarithmic complexity of the delete_min operation of the calendar queue to mostly a linear cache efficient search, while keeping the adding of elements to the calendar queue as O(1) operations.

Additionally, a request with a target service time higher than the preconfigured time limit can be added to a list of outliers, e.g. the outlier list 504. Since the scheduling of these requests may not be time critical, the system permits the slower addition to a sorted list of outliers 504. Furthermore, the concurrent priority queue 501 can use a sequencer, e.g. outliers_seq, to enforce a first-in-first-out (FIFO) order for the outlier list with the same QoS.

For example, the calendar ring 502 can be configured to store requests with a target response time (or QoS) below 2 seconds, since the requests with the QoS higher than 2 seconds can be considered rare. Furthermore, the requests with the QoS below 2 seconds can be placed in the calendar ring 502 that matches QoS, while the requests with the QoS higher than 2 seconds can be placed into the list of outliers 504.

Unlike the calendar queue as shown in FIG. 4, the request manager 510 does not need to put every call to the calendar queue 501 in a synchronized statement. The synchronized block 506, which supports continuation-passing 507, can be implemented within the scope of the concurrent priority queue 501. The consumers, e.g. consumers A-C 511-513, may not need to access the thread pool 520 from outside the concurrent priority queue 501.

Using continuation-passing, the system can transform the calendar queue 501 from non-blocking to blocking. The continuation-passing 507 can enable the consumers A-C 511-513 to manage the idle workers, or Threads 530, in the thread pool 520, so that the threads 530, which may be waiting in the thread pool 520, can be reused.

Additionally, the concurrent priority queue 501 can include a sequencer 503 that enables the concurrent priority queue 501 to detect contention and can use a fast lane 505 to support cooperative concurrency. Thus, the concurrent priority queue 501 can be aware of and handle the contention properly, without a need for the locks to expose knowledge about contention.

Continuation Passing

Figure 6:
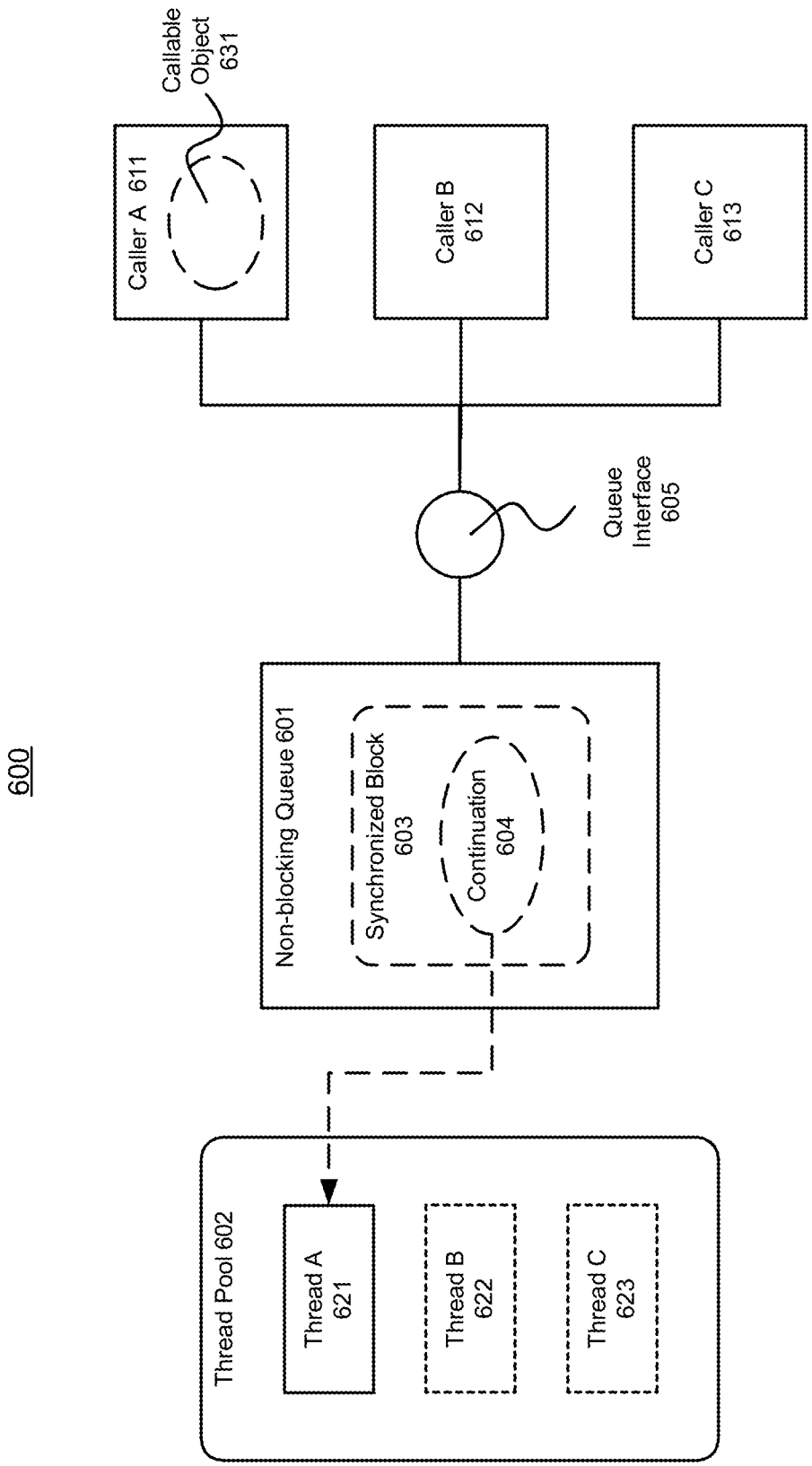
FIG. 6 shows an illustration of transforming a queue from non-blocking to blocking, in accordance with various embodiments of the invention.

FIG. 6 shows an illustration of transforming a queue from non-blocking to blocking, in accordance with various embodiments of the invention. As shown in FIG. 6, the middleware machine environment 600 can include a non-blocking queue 601 that is associated with a thread pool 602, which may not be accessible from outside of the non-blocking queue 601.

Continuation-passing can be used to eliminate serialization points in the non-blocking queue 601. As shown in FIG. 6, a caller, e.g. caller A 611, can pass a callable object 631 via an interface provided by the non-blocking queue. For example, the callable object 631 can be defined based on an interface, callable, which provides a call function that takes an input parameter of type T, and returns an output parameter of type R.

```
public interface callable<T, R> {
    public R call (T o)
}
```

The caller A 611 can use the callable object 631 to manage one or more idle workers, e.g. threads A-C 621-623 in the thread pool 602.

For example, there can be two different exemplary callable objects, AND_THEN and OR_ELSE, each of which can be used to manage the thread pool 602.

The callable object AND_THEN can be used to poll a thread, or idle worker, from the thread pool.

```
public static final callable<Request, Thread> AND_THEN = new
callable<Request, Thread> ( ) {
    public Thread call(Request r) {
        Thread th = threadPool.poll( );
        If (th == null) return null;
        th.request = r;
        return th;
    }
}
```

The callable object OR_ELSE can be used to park a thread in the thread pool.

```
public static final callable<Request, Thread> OR_ELSE = new
callable<Thread, Request> ( ) {
    public Request call(Thread th) {
        threadPool.offer(th);
        return null;
    }
}
```

Furthermore, the non-blocking queue 601 can use a synchronization block 603 to control the operations on the threads, or idle workers, in the thread pool 602, so that there can be no conflict or miss with thread management. The synchronization block 603 can be implemented within the scope of the non-blocking queue to ensure that multiple calls can be made by different callers concurrently.

In accordance with an embodiment of the invention, the non-blocking queue 601 can provide a queue interface 605, which enables a caller, e.g. callers A-C 611-613, to pass a function, or a continuation 604, that can be called when the queue 601 is empty. For example, the contract can be that the call of the function passed to add( ) is serialized with respect to the call of the function passed to delete_min( ). Even though a serialization point is still present, it may only have impact when the queue is empty, or nearly empty. This design enables elimination of serialization in cases when the queue is not empty, which is the most important performance case. If the callers of add( ) and delete_min( ) can detect that the queue is not empty, they may not need to call the continuations and they will not need to be serialized by the queue.

Furthermore, the queue 601 can return whatever is returned by those functions, so that the callers A-C 611-613 can detect that the functions are called. Thus, there can be no need for the callers A-C 611-613 to have the synchronization wrapper from outside.

Using continuation-passing, the non-blocking queue 601 can be transformed into a blocking queue that can interact with a plurality of callers concurrently. The system enables the caller to manage the idle workers in the pool and reuse the threads waiting in the thread pool of the blocking queue.

Figure 7:
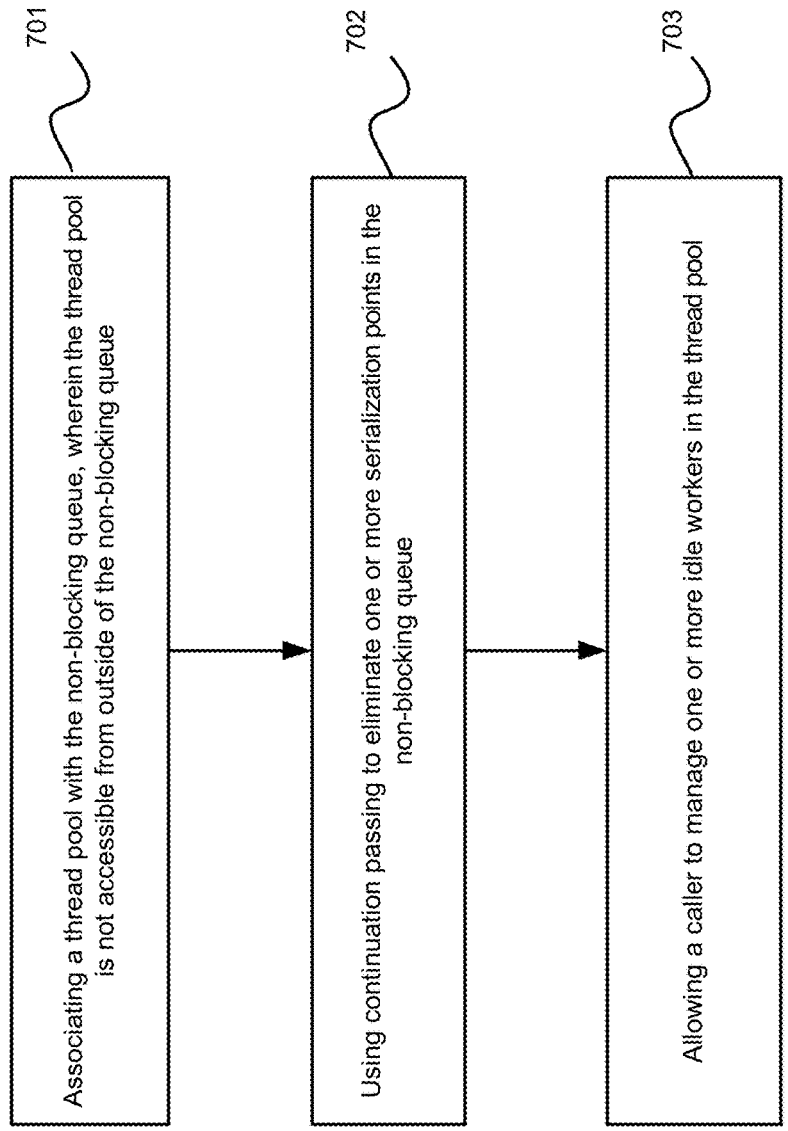
FIG. 7 illustrates an exemplary flow chart for using continuation-passing to transform a non-blocking queue into a blocking queue in accordance with an embodiment of the invention.
Figure 8:
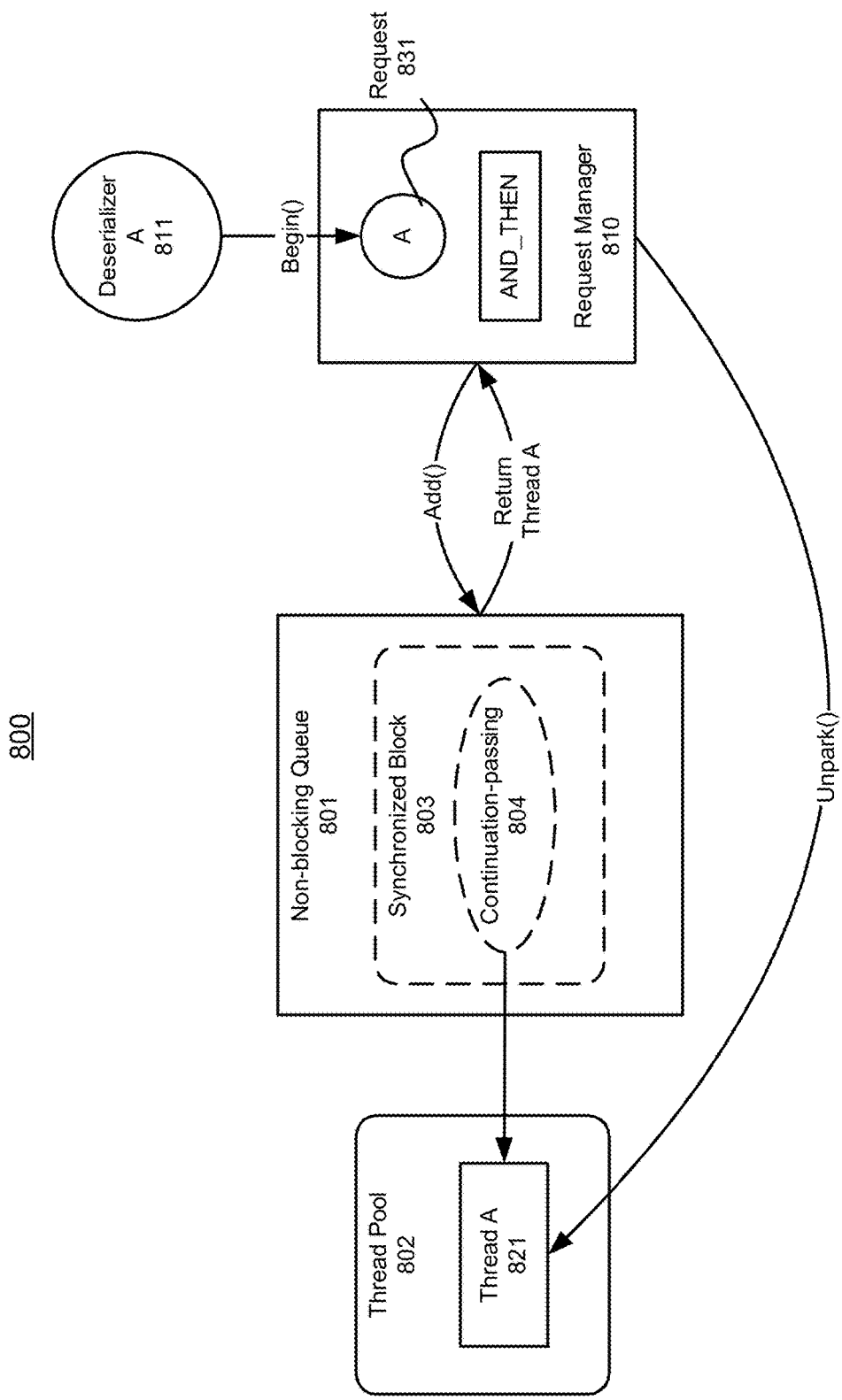
FIG. 8 shows an illustration of activating an idle worker in the thread pool, in accordance with various embodiments of the invention.

FIG. 7 illustrates an exemplary flow chart for using continuation-passing to transform a non-blocking queue into a blocking queue in accordance with an embodiment of the invention. As shown in FIG. 7, at step 701, the system can associate a thread pool with the non-blocking queue, wherein the thread pool is not accessible from outside of the non-blocking queue. Then, at step 702, the system can use continuation-passing to eliminate one or more serialization points in the non-blocking queue. Furthermore, at step 703, the system allows a caller to manage one or more idle workers in the thread pool Activating an Idle Worker in the Thread Pool FIG. 8 shows an illustration of activating an idle worker in the thread pool, in accordance with various embodiments of the invention. As shown in FIG. 8, a non-blocking queue 801 (e.g. a priority queue) in the middleware machine environment 800 can be associated with a thread pool 802, or a waiter list, which may not be accessible from outside of the non-blocking queue. A caller, e.g. deserializer A 811, can add a request, e.g. request A 831, into the non-blocking queue 801.

For example, the caller 811 can use a begin( ) method provided by a request manager 810 to add the request A 811 into the non-blocking queue 801.

```
public void begin(Request r) {
    ...
    Thread th = queue.add(r, AND_THEN, r);
    if (th != null) th.unpark( );       // tell a thread it has a
    request to execute now
    ...
}
```

In the begin( ) method, the request manager 810 can add the request A 831 into the non-blocking queue 801 via a function call of add( ).

```
public R add(Request r, callable<T, R> andThen, T closure) {
    ...
    synchronized (this) {
        if (size.get( ) == 0) {       //queue is empty
            R r = andThen.call(closure);
            If (r != null) return r;
        }
        ...
    }
    ...
}
```

When the queue 801 is empty, the request manager allows the caller to pass the request A 811, r, and a callable object, AND_THEN, in the function call. The add( ) method can return an idle worker, e.g. thread A 821, to the request manager 810. When the request manager 810 receives a reference to the idle worker A 821, the request manager 810 can proceed to activate the idle worker 821, e.g. via unparking the thread A 821 associated with the idle worker 821.

Figure 9:
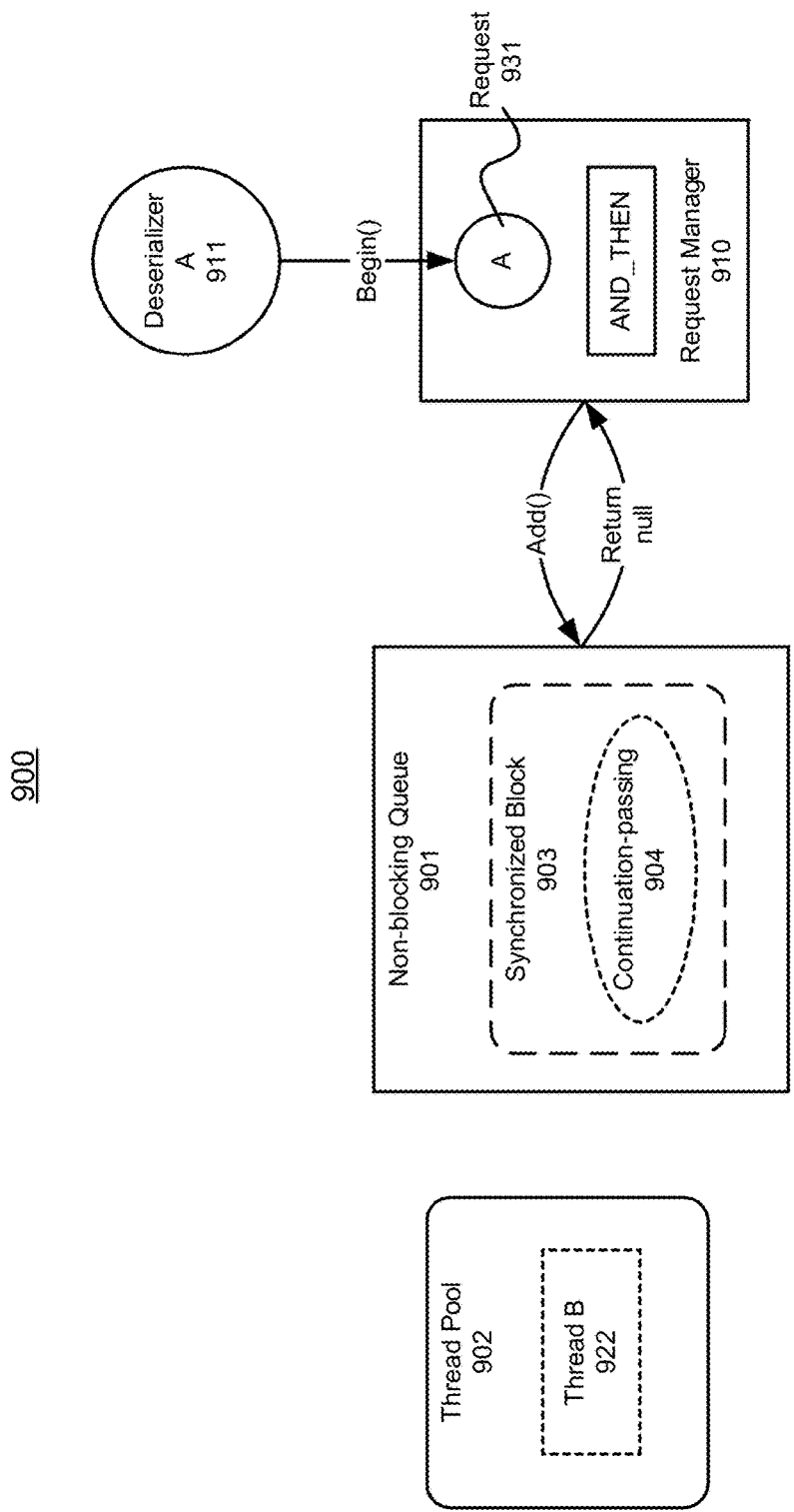
FIG. 9 shows an illustration of adding a request to the non-blocking queue without activating an idle worker in the thread pool, in accordance with various embodiments of the invention.

FIG. 9 shows an illustration of adding a request to the non-blocking queue without activating an idle worker in the thread pool, in accordance with various embodiments of the invention. As shown in FIG. 9, when the non-blocking queue 901 (e.g. a priority queue) in the middleware machine environment 900 is not empty, a caller, e.g. deserializer A 911, can add a request, e.g. request A 931, into the non-blocking queue 901 without a need to activate an idle worker, e.g. thread B 922, in the thread pool 902.

In the example as shown in FIG. 9, the caller 911 can pass the callable object, AND_THEN, into the queue 901. Unlike the example as shown in FIG. 8, the function, or continuation 904, will not be called since the queue 901 is not empty. Consequently, the queue 901 may return a null value back to the caller A 911, which indicates that the function, or continuation 904 in the synchronization block 903, is not called.

Place a Thread in the Waiter List

Figure 10:
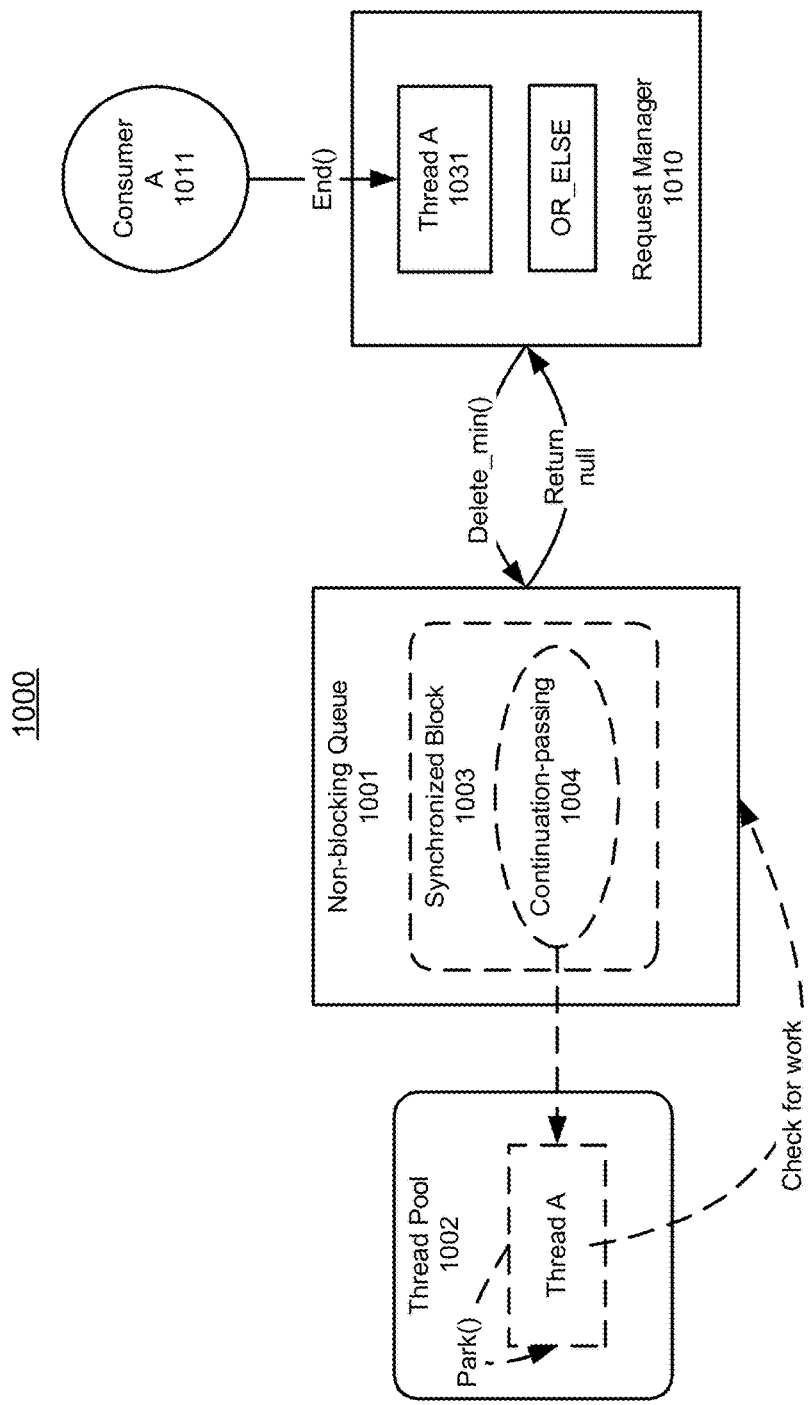
FIG. 10 shows an illustration of placing a thread in the thread pool, in accordance with various embodiments of the invention.

FIG. 10 shows an illustration of placing a thread in the thread pool, in accordance with various embodiments of the invention. As shown in FIG. 10, a caller, e.g. consumer A 1011, can release a thread, e.g. thread A 1031, back to a thread pool 1002 associated with the non-blocking queue 1001 (e.g. a priority queue) in the middleware machine environment 1000. The thread pool 1002 may not be accessible from outside of the non-blocking queue 1001.

For example, the caller A 1011 can call an end( ) function provided by a request manager 1010 to release the thread A 1031.

```
public Request end(Thread th) {
    return queue.delete_min(OR_ELSE, th);   // the thread will
    if no work is in the queue and park
}
```

Then, the request manager 1010 can place a function call of delete_min( ), which can either claim a request from the queue 1001 or place an thread back to the thread pool 1002, depending on whether the queue 1001 is empty.

```
public R delete_min (callable<T, R> orElse, T closure) {
    ...
    synchronized (this) {
        if (size.get( ) == popped) {       //queue is empty
            return orElse.call(closure);
        }
        ...
    }
    ...
}
```

As shown in FIG. 10, when the queue 1001 is empty, the request manager 1010 allows the caller to pass the thread A 1031, th, and a callable object, OR_ELSE, in the function call. The call( ) method provided by the callable object, OR_ELSE, can place the thread, th, into the thread pool 1002, using the continuation-passing 1004 in the synchronization block 1003. The thread A 1031, in turn, can check with the non-blocking queue 1001 for available work before parking itself into the thread pool 1002 and waiting for someone to release it.

Figure 11:
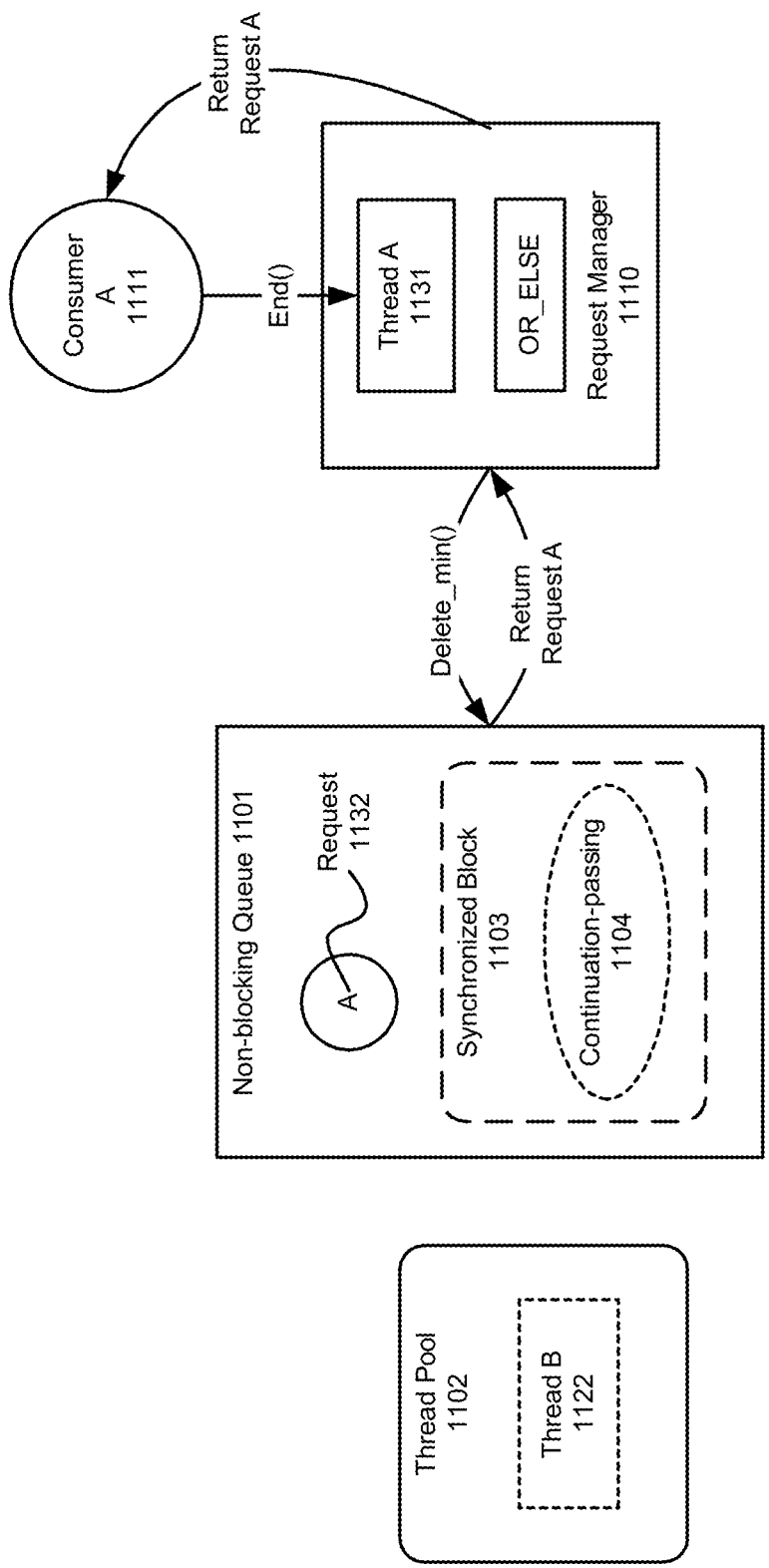
FIG. 11 shows an illustration of claiming a request from the queue, in accordance with various embodiments of the invention.

FIG. 11 shows an illustration of claiming a request from the queue, in accordance with various embodiments of the invention. As shown in FIG. 11, when the non-blocking queue 1101 (e.g. a priority queue) in the middleware machine environment 1100 include a request, e.g. request A 1131. A caller, e.g. deserializer A 1111, can claim the request A 1131, from the non-blocking queue 1101 without a need to access the thread pool 1102 (which is shown containing an idle worker, thread B 1122).

In the example as shown in FIG. 11, the caller A 1111 can pass the callable object, OR_ELSE, into the queue 1101. Unlike the example as shown in FIG. 10, the function, or continuation 1104, will not be called since the queue 1101 is not empty. Consequently, the queue 1101 may return the claimed request A back to the caller A 1111, which indicates that the function, or continuation-passing 1104 in the synchronization block 1103, is not called.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for transforming a queue from non-blocking to blocking, comprising:
    instantiating a callable object, the callable object having at least one function that can be called;
    providing a non-blocking queue into which requests are placed for processing;
    providing a function of the non-blocking queue that accepts a first parameter and a second parameter;
    associating a thread pool with the non-blocking queue, wherein the thread pool contains one or more threads that process the requests placed in the non-blocking queue, and wherein the thread pool is accessible from the non-blocking queue;
    calling the function of the non-blocking queue from a request manager;
    including, by the request manager, a caller request as the first parameter of the function of the non-blocking queue, and the instantiated callable object as the second parameter of the non-blocking queue;
    determining, by the function of the non-blocking queue, that the non-blocking queue is available to process the caller request;
    calling, by the function of the non-blocking queue, the at least one function of the callable object;
    polling, by the at least one function of the callable object, a thread from the thread pool;
    returning, by the at least one function of the callable object, the polled thread to the function of the non-blocking queue;
    returning, by the function of the non-blocking queue, the polled thread to the request manager; and
    using the polled thread within the thread pool, to process the caller request.

2. The method according to claim 1, further comprising:
    associating, by the at least one function of the callable object, the polled thread with the caller request.

3. The method according to claim 1, wherein the function of the non-blocking queue is an add( ) function.

4. The method according to claim 1, wherein the class of the callable object implements an interface, and wherein the interface defines the at least one function of the callable object.

5. The method according to claim 1, further comprising:
    the request manager allowing a plurality of callers to access the non-blocking queue concurrently via the function of the non-blocking queue.

6. The method according to claim 1, wherein the thread pool is not accessible from outside of the non-blocking queue.

7. The method according to claim 1, wherein the request manager calls the function of the non-blocking queue via an interface provided by the non-blocking queue.

8. The method according to claim 1, wherein the determining that the non-blocking queue is available to process the request includes determining that the non-blocking queue is empty.

9. The method according to claim 1, further comprising when the non-blocking queue is not empty, returning a null value to the request manager.

10. A system for transforming a queue from non-blocking to blocking, comprising:
    one or more microprocessors;
    a non-blocking queue into which requests can be placed for processing, and that exposes a function of the non-blocking queue that accepts a first parameter and a second parameter;
    a thread pool that is associated with the non-blocking queue, wherein the thread pool contains one or more threads that process the requests placed in the non-blocking queue, and wherein the thread pool is accessible from the non-blocking queue;
    wherein the system, running on the one or more microprocessors, operates to:
        instantiate a callable object, the callable object having at least one function that can be called;
        call the function of the non-blocking queue from a request manager, wherein the request manager includes a caller request as the first parameter of the function of the non-blocking queue, and the instantiated callable object as the second parameter of the non-blocking queue;
        determine, via the function of the non-blocking queue, that the non-blocking queue is available to process the caller request;
        call, via the function of the non-blocking queue, the at least one function of the callable object;
        poll, via the at least one function of the callable object, a thread from the thread pool;
        return, via the at least one function of the callable object, the polled thread to the function of the non-blocking queue;
        return, by the function of the non-blocking queue, the polled thread to the request manager;
        and
        use the polled thread within the thread pool, to process the caller request.

11. The system according to claim 10, wherein the system further operates to associate, via the at least one function of the callable object, the polled thread with the caller request.

12. The system according to claim 10, wherein the function of the non-blocking queue is an add( ) function.

13. The system according to claim 10, wherein the class of the callable object implements an interface, and wherein the interface defines the at least one function of the callable object.

14. The system according to claim 10, wherein the thread pool is not accessible from outside of the non-blocking queue.

15. The system according to claim 10, wherein the request manager calls the function of the non-blocking queue via an interface provided by the non-blocking queue.

16. The system according to claim 10, wherein determination that the non-blocking queue is available to process the request includes determining that the non-blocking queue is empty.

17. The system according to claim 10, wherein when the non-blocking queue is not empty, returning a null value to the request manager.

18. A non-transitory machine readable storage medium having instructions stored thereon that when executed cause a system to transform a queue from non-blocking to blocking, by performing a method comprising:
  instantiating a callable object, the callable object having at least one function that can be called;
  providing a non-blocking queue into which requests are placed for processing;
  providing a function of the non-blocking queue that accepts a first parameter and a second parameter;
  associating a thread pool with the non-blocking queue, wherein the thread pool contains one or more threads that process the requests placed in the non-blocking queue, and wherein the thread pool is accessible from the non-blocking queue;
  calling the function of the non-blocking queue from a request manager;
  including, by the request manager, a caller request as the first parameter of the function of the non-blocking queue, and the instantiated callable object as the second parameter of the non-blocking queue;
  determining, by the function of the non-blocking queue, that the non-blocking queue is empty;
  calling, by the function of the non-blocking queue, the at least one function of the callable object;
  polling, by the at least one function of the callable object, a thread from the thread pool;
  associating, by the at least one function of the callable object, the polled thread with the caller request;
  returning, by the at least one function of the callable object, the polled thread to the function of the non-blocking queue;
  returning, by the function of the non-blocking queue, the polled thread to the request manager;
  and
  using the polled thread within the thread pool, to process the caller request.

* * * * *

UNITED STATES PATENT AND TRADEMARK OFFICE
CERTIFICATE OF CORRECTION

Page 1 of 1

PATENT NO.         : 10,095,562 B2
APPLICATION NO.    : 13/781500
DATED              : October 9, 2018
INVENTOR(S)        : Otenko It is certified that error appears in the above-identified patent and that said Letters Patent is hereby corrected as shown below:

In the Specification

Column 6, Line 64, after "pool" insert -- . --.

Column 9, Line 8, after "data" insert -- . --.

Signed and Sealed this
Eighteenth Day of February, 2020

Andrei Iancu
*Director of the United States Patent and Trademark Office*